United States Patent
Toyama et al.

(10) Patent No.: US 7,023,598 B2
(45) Date of Patent: Apr. 4, 2006

(54) OPTICAL SCANNER AND LASER MACHINING APPARATUS

(75) Inventors: Souichi Toyama, Tsuchiura (JP); Atsushi Sakamoto, Tsuchiura (JP); Haruaki Otsuki, Tsuchiura (JP); Yaichi Okubo, Ebina (JP)

(73) Assignee: Hitachi Via Mechanics, Ltd., Ebina (JP)

( * ) Notice: Subject to any disclaimer, the term of this patent is extended or adjusted under 35 U.S.C. 154(b) by 21 days.

(21) Appl. No.: 10/758,287

(22) Filed: Jan. 16, 2004

(65) Prior Publication Data

US 2004/0212862 A1    Oct. 28, 2004

(30) Foreign Application Priority Data

Jan. 20, 2003  (JP) .............................. 2003-011399

(51) Int. Cl.
   *G02B 26/08*   (2006.01)
(52) U.S. Cl. ........................ 359/212; 359/226
(58) Field of Classification Search ........ 359/212–219, 359/226; 250/234–236, 203.1–203.6, 201.1, 250/214 AG, 214 C; 219/121.8, 121.81, 219/121.82; 356/139.04, 139.05, 138
   See application file for complete search history.

(56) References Cited

U.S. PATENT DOCUMENTS

| | | | | |
|---|---|---|---|---|
| 4,864,295 A | * | 9/1989 | Rohr | 340/870.37 |
| 5,844,673 A | * | 12/1998 | Ivers | 356/138 |
| 5,907,146 A | * | 5/1999 | Bridgelall et al. | 235/470 |
| 6,486,683 B1 | * | 11/2002 | Nussbaum | 324/681 |
| 6,703,603 B1 | * | 3/2004 | Tohyama et al. | 250/234 |
| 6,850,812 B1 | * | 2/2005 | Dinauer et al. | 700/166 |

\* cited by examiner

*Primary Examiner*—Euncha P. Cherry
*Assistant Examiner*—Pranav Khatri
(74) *Attorney, Agent, or Firm*—Crowell & Moring LLP

(57) ABSTRACT

An optical scanner which can realize target trajectory tracking machining at a high speed and with a high accuracy. In a servo control circuit controlling the operation of an X-axis scanner for positioning a mirror and the operation of a Y-axis scanner for positioning another mirror, sine wave response is performed at a specific frequency on feedback control for each axis so that the gain characteristic and the phase characteristic of the feedback control are estimated. This arithmetic operation processing is performed by a microprocessor prior to machining, and the results of estimation of the two axes are stored as data for each frequency. In the stage of machining, the results of estimation in terms of the gain characteristic and the phase characteristic are used for correcting the amplitude and phase of a sine wave of a target trajectory in order to cancel each characteristic.

12 Claims, 4 Drawing Sheets

OPTICAL SCANNER AND LASER MACHINING APPARATUS

BACKGROUND OF THE INVENTION

The present invention relates to an optical scanner in which the angle of a mirror fixed to a rotating shaft is detectaed and the rotating shaft is controlled to track a desired value indicating an instructed angle of the mirror, and a laser machining apparatus using the optical scanners.

In a laser machining apparatus for performing laser marking or perforating a printed board, coordinates of a machining position are transformed into coordinates to be used as mirror angle instruction data. Then, the angle of the mirror is changed by an optical scanner so that a work to be machined is irradiated at the machining position with a laser beam outputted from a laser oscillator. Ordinarily the laser beam has to be positioned two-dimensionally. Therefore, a pair of optical scanners corresponding to two orthogonal coordinate axes (X-axis and Y-axis) are used. In this case, the optical scanner for positioning the laser beam in the X-axis direction (hereinafter referred to as "X-axis scanner") and the optical scanner for positioning the laser beam in the Y-axis direction (hereinafter referred to as "Y-axis scanner") can be controlled independently of each other. However, it is necessary to synchronize the control of the two optical scanners with the emitting time of the laser beam.

Each optical scanner is provided with a sensor for detecting the angle of the mirror and a servo control circuit for performing feedback of the angle.

When the laser machining apparatus is used for perforating a printed board, there are two machining modes. One is a mode for machining a hole whose diameter is substantially as large as the diameter of the laser beam. The other is a mode for machining a hole whose diameter is larger than the diameter of the laser beam.

In the former case, the laser beam is emitted as pulses after the mirror is made to stand still at an angle corresponding to a machining position. Thus, a hole whose diameter is about 50–300 μm substantially equal to the laser beam diameter can be machined. The machining pitch in this machining mode is usually about 0.5–1 mm.

On the other hand, in the latter case, two sine waves 90° phase-shifted from each other are supplied as angle instructions to the X-axis scanner and the Y-axis scanner in the form of a target trajectory, while irradiation with a laser beam is repeated with a period such that beam spots overlap each other partially. The trajectory of the laser beam (hereinafter referred to as "beam trajectory") follows a phase plane trajectory of the mirror's motion, that is, a circle whose diameter is proportional to the amplitude of the sine waves. Thus, when the aforementioned operation is repeated while the diameter of the beam trajectory is varied stepwise with its center being fixed, circular trepanning can be performed.

In addition, when the angle instructions to the X-axis scanner and the Y-axis scanner are varied, a desired beam trajectory can be drawn (hereinafter the machining mode for drawing a beam trajectory will be referred to as "target trajectory tracking machining".).

Incidentally, U.S. Pat. No. 4,864,295 discloses a technique of a variable capacitance type angle sensor serving as means for detecting the rotating angle of a mirror. In the angle sensor, a dielectric flat plate attached to a rotating shaft is sandwiched between a pair of fixed pole plates so as to electrically detect the angle of the rotating shaft as a change of capacitance between the pole plates.

In addition, JP-A-4-127981 discloses a technique in which a mirror is irradiated with a laser beam for measuring the angle of the mirror, and reflected light of the laser beam is detected by a linear sensor so as to detect the rotating angle of the mirror.

The pulse oscillation frequency of a carbon dioxide laser is not lower than about 4 kHz, and the pulse oscillation frequency of a UV-YAG laser is not lower than about 20 kHz. On the other hand, the control frequency bandwidth of an optical scanner is about 1 kHz, which is lower than the pulse oscillation frequency of any laser. Therefore, if tracking control of the mirror can be made precisely with a frequency as high as possible, target trajectory tracking machining can be performed at a higher speed and with a higher accuracy.

SUMMARY OF THE INVENTION

To solve the foregoing problem belonging to the background art, it is an object of the present invention to provide an optical scanner which can perform target trajectory tracking machining at a high speed and with a high accuracy.

With a configuration in which a target trajectory is generated in a servo control circuit instead of with a configuration in which discrete time data of a target trajectory is transmitted from a host control circuit to an X-axis scanner and a Y-axis scanner, the cumulative time required for transmission can be cut down on a large scale. It is therefore estimated that target trajectory tracking machining can be performed at a higher speed.

The present inventor manufactured an optical scanner based on this concept, and confirmed the operation thereof. Incidentally, the prototype of optical scanners is the same as FIG. 1 which is a block diagram of a scanner system including two optical scanners according to the present invention, except for the operation of a microprocessor. Therefore, the prototype of optical scanners will be described below with reference to FIG. 1.

A scanner system S is constituted by an X-axis scanner 1, a Y-axis scanner 2, a servo control circuit 3 and a control circuit 5.

The X-axis scanner 1 is constituted by an actuator 11 and a mirror 12 fixed to a rotating shaft 13 of the actuator 11. The Y-axis scanner 2 is constituted by an actuator 21 and a mirror 22 fixed to a rotating shaft 23 of the actuator 21. Each actuator 11, 21 includes an angle sensor 14, 24 for detecting the angle of the rotating shaft 13, 23 so that the angle of the mirror 12, 22 can be known. The actuators 11 and 21 are controlled by the servo control circuit 3.

The control circuit 5 controls the output timing of a laser oscillator 7 while receiving information from a calculating unit 6, and transmitting information to the servo control circuit 3. The information from the calculating unit 6 includes a machining position. The information to the servo control circuit 3 includes angle instructions to the mirrors 12 and 22 and feature quantities of a shape to be machined.

The configuration of the servo control circuit 3 will be described further in detail.

A microprocessor 32 has a storage area for storing programs and data required for generating desired values. The microprocessor 32 generates desired values to be supplied to DA converters 33 and 39 on the basis of instruction data received from the control circuit 5.

The DA converters 33 and 39 convert the desired values of digital signals generated by the microprocessor 32, into analog signals respectively. AD converters 38 and 44 convert analog signals supplied from the angle sensors 14 and 24, into digital signals respectively.

Normalized cosine and sine waves corresponding to one period are stored in discrete time in a ROM 45. A RAM 46 stores angle detection signals in the discrete time imported via the AD converters 38 and 44. A data bus 31 transmits the digital signals in the servo control circuit 3.

A feedback control circuit of the mirror 12 (X-axis) is constituted by an adder 34, a servo compensator 35, a power amplifier 36 and an angle detection circuit 37. The angle detection circuit 37 detects the angle of the mirror 12 from an output signal of the angle sensor 14 included in the actuator 11. The adder 34 calculates a deviation between the desired value supplied from the DA converter 33 and the detection signal supplied from the angle detection circuit 37, and supplies the result of the calculation to the servo compensator 35. The servo compensator 35 calculates a control signal which can reduce the deviation signal supplied from the adder 34. The servo compensator 35 supplies the result of the calculation to the power amplifier 36. The power amplifier 36 supplies a drive current to the actuator 11 based on the control signal supplied from the servo compensator 35.

In the same manner, a feedback control circuit of the mirror 22 (Y-axis) is constituted by an adder 40, a servo compensator 41, a power amplifier 42 and an angle detection circuit 43. The angle detection circuit 43 detects the angle of the mirror 22 from an output signal of the angle sensor 24 included in the actuator 21. The adder 40 calculates a deviation between the desired value supplied from the DA converter 39 and the detection signal supplied from the angle detection circuit 43, and supplies the result of the calculation to the servo compensator 41. The servo compensator 41 calculates a control signal which can reduce the deviation signal supplied from the adder 40. The servo compensator 41 supplies the result of the calculation to the power amplifier 42. The power amplifier 42 supplies a drive current to the actuator 21 based on the control signal supplied from the servo compensator 41.

When a target trajectory is circular, data about the diameter of a hole and the coordinates of the center of the hole are given from the control circuit 5 to the microprocessor 32 as feature quantities. Then, the scanner system S operates as follows.

For each constant sampling period, the microprocessor 32 reads sine wave data (data of a cosine wave for the mirror 12 and data of a sine wave for the mirror 22) stored in the ROM 45 and having normalized amplitude. Based on the diameter of the hole given as the feature quantity, the microprocessor 32 multiplies the read data by a coefficient such that the amplitude is matched to the radius of the target trajectory. In addition, based on the data of the coordinates of the center, the microprocessor 32 adds a fixed value to the data so as to make the oscillation center coincide with the coordinates of the center of the target trajectory.

FIGS. 4A and 4B are graphs showing the relation between an input waveform and a response waveform in each feedback control circuit. FIG. 4A shows case for the mirror 12, and FIG. 4B shows the case for the mirror 22. In addition, FIG. 5 shows a phase plane trajectory in the scanner system S. Incidentally, in each of FIGS. 4A, 4B and 5, the broken line designates the input waveform, and the solid line designates the response waveform.

As shown in FIGS. 4A and 4B, the amplitude of the response waveform (Yx, Yy) is smaller than the amplitude of the target trajectory (Rx, Ry) in each mirror 12, 22. Since the amplitude of the response waveform is a radius of the beam trajectory, the diameter of the output beam trajectory becomes smaller than that of the target trajectory as shown in FIG. 5. In addition, as shown in FIG. 5, the values of the two points where the beam trajectory crosses the X-axis are larger than the values of the two points where the beam trajectory crosses the Y-axis, respectively. That is, the beam trajectory draws an ellipse. Therefore, with this beam trajectory, the machining accuracy cannot be improved.

The present inventor examined the frequency response characteristics of the feedback control circuits of the mirrors 12 and 22.

FIG. 6 is a Bode diagram showing the frequency response characteristics of the feedback control circuit of the mirror 12, and FIG. 7 is a Bode diagram showing the frequency response characteristics of the feedback control circuit of the mirror 22. In each diagram, the upper graph shows the gain characteristic and the lower graph shows the phase characteristic.

In the feedback control of the angle, a transfer function from the input of a desired value to a response variable, that is, a detection signal of the angle sensor has a gain of 1 (0 dB) and a phase delay of 0° as DC characteristics. On the contrary, the gain in the obtained result is lowered in higher frequency band in each mirror 12, 22. Incidentally, the characteristic waveforms of the mirrors 12 and 22 resemble each other qualitatively but differ from each other quantitatively. As a result, a gap between the frequency response characteristic in the feedback control circuit of the mirror 12 and that in the feedback control circuit of the mirror 22 becomes large in the higher frequency band including a resonance frequency of a controlled object. Even if sine waves 90° phase-shifted from each other are supplied as desired values to the two feedback control circuits configured thus, the comparison of their response variables with each other will make it clear that the amplitude in one differs from that in the other more conspicuously in the higher frequency band while the phase shift is also out of 90 degrees.

In addition, the dynamic characteristics of the feedback control circuits are adjusted so that the feedback control circuit operates stably in accordance with the dynamic characteristics of controlled object or its individual difference. It is therefore difficult to eliminate a gap between the dynamic characteristics of the feedback control circuits when the controlled object have different inertial loads.

From the above results, the present inventor found that the lowering of the gain characteristic and the phase delay have to be solved in order to match the beam trajectory to the target trajectory.

Incidentally, for example, the difference in inertial load between the mirror 12 and the mirror 22 can be considered as a cause in lowering of the gain characteristic and the phase characteristic in the higher frequency band. That is, on the assumption that a laser beam is reflected on the mirror 12 and the mirror 22 in that order, the mirror 22 has to have outside dimensions larger than those of the mirror 12 in order to cover the movable range of the laser beam depending on the mirror 12. Thus, the inertia load of the mirror 22 becomes larger than that of the mirror 12.

Based on such a result, a first configuration of the present invention provides an optical scanner having feedback control means, detecting the angle of a mirror fixed to a rotating shaft and controlling the angle so that the angle coincides with a desired value. In the optical scanner, corrected target trajectory generating means is provided for correcting a target trajectory so as to cancel a gain characteristic and a phase characteristic of the feedback control means with respect to a specific frequency, and an output signal of the corrected target trajectory generating means is supplied to the feedback control means as the desired value.

In addition, a second configuration of the present invention provides a laser machining apparatus. In the laser machining apparatus, two optical scanners according to the aforementioned first configuration are provided, and a two-dimensional trajectory of a laser beam is drawn in a surface of a work to be machined, so that the work is machined two-dimensionally by the laser beam.

DETAILED DESCRIPTION OF PREFERRED EMBODIMENT

Figure 1:
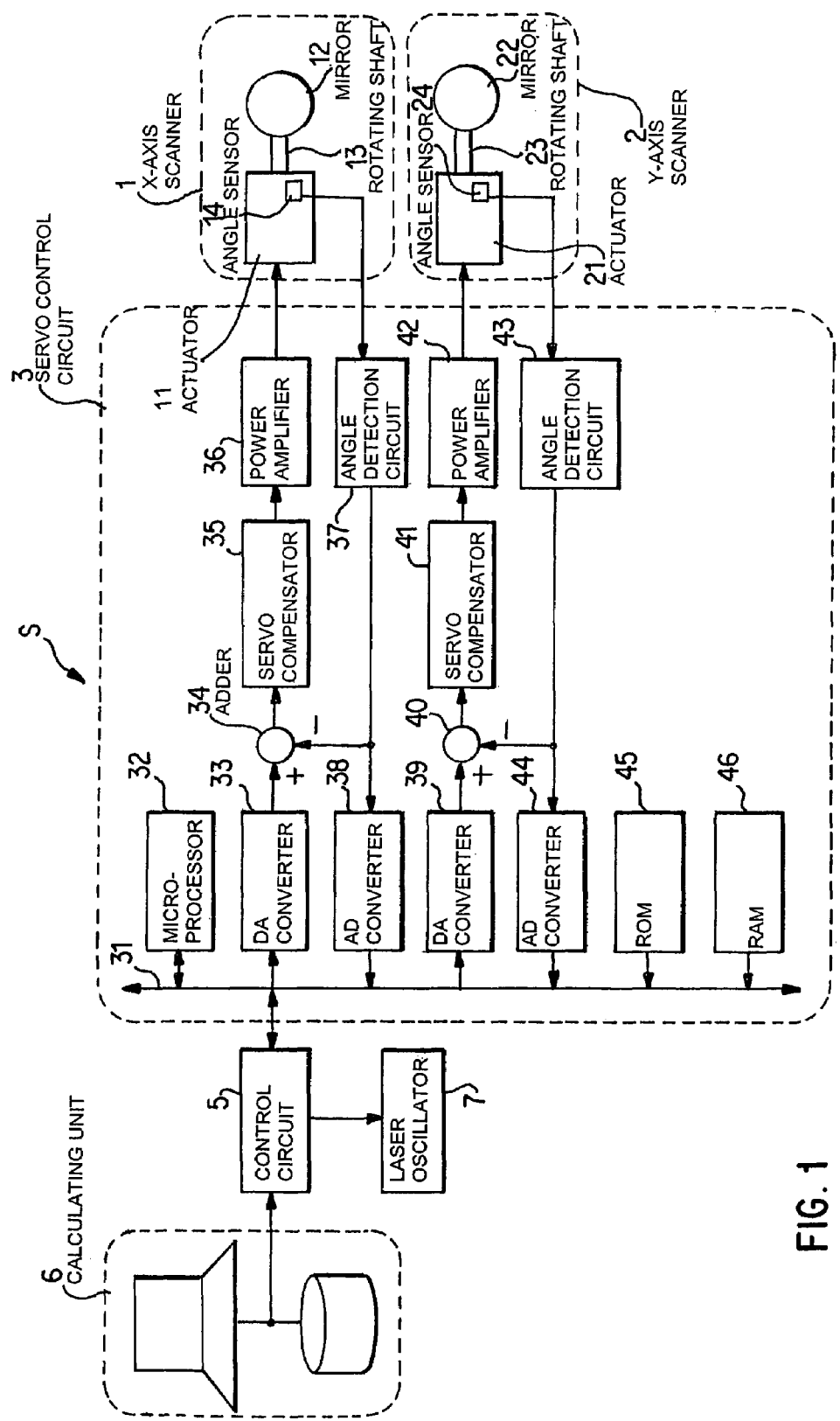
FIG. 1 is a block diagram of a scanner system according to the present invention.

The present invention will be described below based on its embodiment shown in the drawings.

FIG. 1 is a block diagram of a scanner system according to the present invention. Incidentally, all the constituent parts are similar to those described in Summary of the Invention, except for the operation of a microprocessor 32. Therefore, the similar parts will not be described repeatedly.

The microprocessor 32 according to this embodiment performs two-step processing constituted by Step 1 and Step 2 which will be described below.

Specific description will be made below.

A cosine wave shown by Expression 1 and a sine wave shown by Expression 2 are supplied as desired values $R_x$ and $R_y$ to the feedback control circuits of the mirrors 12 and 22 respectively with a fixed sampling period Ts. Incidentally, in Expressions 1 and 2, A designates amplitude, $\omega$ designates an angular frequency for measuring dynamic characteristics, and n designates an integer expressing a discrete time.

Here, when the amplitude is $B_x$, $B_y$, and the phase angle is $\psi_x$, $\psi_y$, an angle detection signal (response signal) $Y_x$, $Y_y$ of the X-axis, Y-axis mirror after sampling can be obtained by Expression 3, 4.

$$R_x(n \cdot Ts) = A \cdot \cos(\omega \cdot n \cdot Ts) \qquad \text{(Expression 1)}$$

$$R_y(n \cdot Ts) = A \cdot \sin(\omega \cdot n \cdot Ts) \qquad \text{(Expression 2)}$$

$$Y_x(n \cdot Ts) = B_x \cdot \cos(\omega \cdot n \cdot Ts + \psi_x) \qquad \text{(Expression 3)}$$

$$Y_y(n \cdot Ts) = B_y \cdot \sin(\omega \cdot n \cdot Ts + \psi_y) \qquad \text{(Expression 4)}$$

Incidentally, to estimate the dynamic characteristics, the transient state after the start of the sine wave response has to be attenuated sufficiently. For example, therefore, response data in five periods in the latter half of ten periods of desired values inputted are used. In this case, the discrete time n in Expressions 1 to 4 is set at 0 at the beginning of the five periods in the latter half.

The procedure of estimation in the case of the mirror 12 (X-axis) will be described below.

When $\alpha_0$ and $\alpha_1$ designate coefficients of cosine and sine wave components respectively, Expression 3 can be expressed by Expression 5 as a superposition of cosine and sine waves. Then, Expression 5 can be expressed by Expression 8 using Expressions 6 and 7.

$$\begin{aligned} Y_x(n \cdot Ts) &= \alpha_0 \cdot A \cdot \cos(\omega \cdot n \cdot Ts) + \\ & \quad \alpha_1 \cdot A \cdot \sin(\omega \cdot n \cdot Ts) \\ &= \alpha_0 \cdot R_x(n \cdot Ts) + \alpha_1 \cdot R_y(n \cdot Ts) \end{aligned} \qquad \text{(Expression 5)}$$

$$\alpha_0/\sqrt{(\alpha_0^2 + \alpha_1^2)} = \cos \phi_x \qquad \text{(Expression 6)}$$

$$\alpha_1/\sqrt{(\alpha_0^2 + \alpha_1^2)} = \sin \phi_x \qquad \text{(Expression 7)}$$

$$\begin{aligned} Y_x(n \cdot Ts) &= \{\sqrt{(\alpha_0^2 + \alpha_1^2)}\}[\{\alpha_0/\sqrt{(\alpha_0^2 + \alpha_1^2)}\} \cdot R_x(n \cdot Ts) + \{\alpha_1/\sqrt{(\alpha_0^2 + \alpha_1^2)}\} \cdot R_y(n \cdot Ts)] \\ &= \{\sqrt{(\alpha_0^2 + \alpha_1^2)}\}[A \cdot \cos(\omega \cdot v \cdot Ts) \cdot \cos\phi_x + A \cdot \sin(\omega \cdot n \cdot Ts) \cdot \sin\phi_x] \\ &= \{\sqrt{(\alpha_0^2 + \alpha_1^2)}\} \cdot A \cdot \cos(\omega \cdot n \cdot Ts - \phi_x) \end{aligned} \qquad \text{(Expression 8)}$$

(1) Step 1: To Estimate Gain Characteristic and Phase Characteristic of Feedback Control Sine waves stored in the ROM 45 are read sequentially. Desired values are supplied to the feedback control circuits of the mirrors 12 and 22 at a specific frequency (intended to be adopted in machining) respectively. Angle detection signals responding to the desired values are sampled by the AD converters 38 and 44 respectively, and stored in the RAM 46. Then, the amplitude ratio and the phase difference between each desired value and its response signal are calculated so that a gain characteristic and a phase characteristic of feedback control at that frequency are estimated.

Incidentally, the coefficients $\alpha_0$ and $\alpha_1$ are estimated by applying a least square method to time-seris data of the desired values Rx and Ry in Expressions 1 and 2 and the response signals Yx in Expression 5. From the obtained coefficient values, the gain characteristic and the phase characteristic of the feedback control circuit of the mirror 12 with respect to the frequency are calculated in Expressions 9 and 10 respectively. Then, these estimated values are stored in a memory included in the microprocessor 32.

$$B_x/A = \sqrt{(\alpha_0^2 + \alpha_1^2)} \qquad \text{(Expression 9)}$$

$$\psi_x = -\phi_x = \tan^{-1}(\alpha_1/\alpha_0) \qquad \text{(Expression 10)}$$

The gain characteristic and the phase characteristic of the feedback control circuit of the mirror 22 are estimated by similar arithmetic operation processing. Then, these estimated values are stored in the memory included in the microprocessor 32.

When the target trajectory is one circle, the processing of Step 1 is then terminated. On the other hand, when a circular hole is machined by trepanning, the following operation is further performed.

In the case of circular trepanning, laser beam pulses have to be emitted with a fixed period while varying the diameter of the beam trajectory to draw concentric circles. In order to machine the work to be machined at a uniform rate in the depth direction, the overlap area of neighboring beam spots has to be fixed, that is, the linear velocity of the beam has to be fixed regardless of the diameter of the target trajectory. That is, the frequency of the target trajectory sine wave has to be varied in inverse proportion to the radius of the target trajectory. Therefore, in the case of trepanning, the dynamic characteristics with respect to each of a plurality of frequencies corresponding to diameters of target trajectories are estimated in the same manner as mentioned above. The results are stored.

(2) Step 2: To Correct Gain Characteristic and Phase Characteristic

In Step 2, a target trajectory corrected with inverse dynamic characteristics of the aforementioned estimated results is generated to perform target trajectory tracking machining practically.

As for the response of the mirror angle in the case of the angular frequency ω, the amplitude with respect to the target trajectory is reduced or increased as shown in Expression 9, and a phase lag or a phase lead appears as shown in Expression 10. Accordingly, the microprocessor 32 outputs desired values as follows. That is, whenever the microprocessor 32 reads a cosine wave or a sine wave from the ROM 45 sequentially with a constant sampling period, the microprocessor 32 obtains the amplitude of the target trajectory by multiplying the radius of the circle by the reciprocal of Expression 9, and corrects the phase with a reversal of the sign of Expression 10. The microprocessor 32 supplies a desired value obtained thus to the adder 34. In such a manner, the mirror can be made to track the uncorrected target trajectory, that is, the instructed target trajectory accurately in the steady state.

Figure 2A:
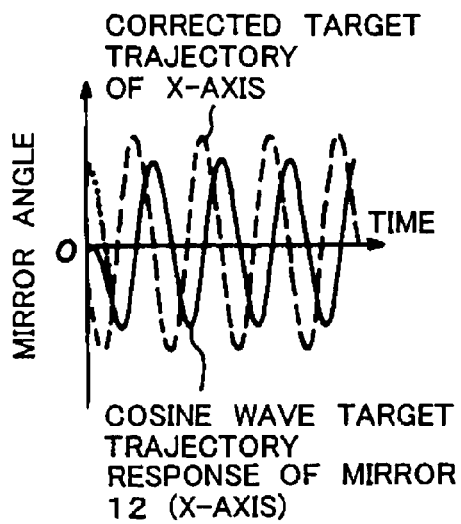
FIGS. 2A and 2B are graphs each showing a target trajectory, a corrected target trajectory and a response waveform according to the present invention.
Figure 2B:
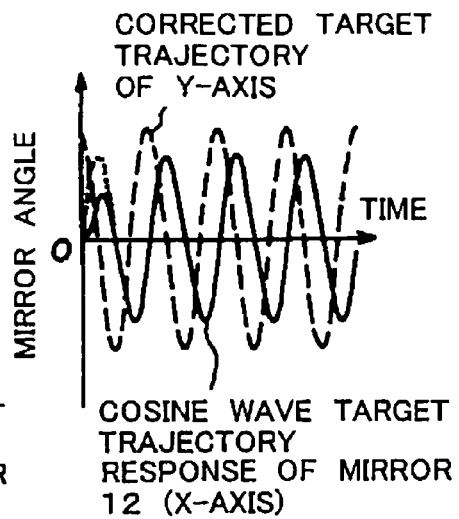
Figure 4A:
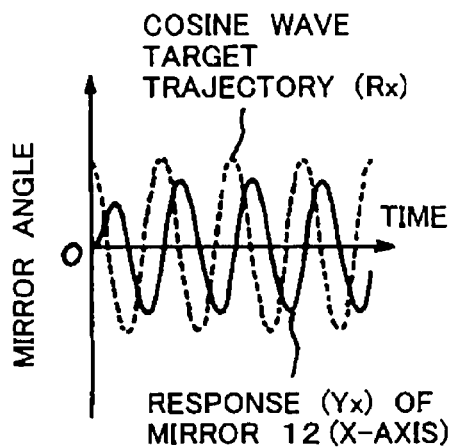
FIGS. 4A and 4B are graphs showing the relation between an input waveform and an output waveform in each feedback control circuit manufactured by way of trial.
Figure 4B:
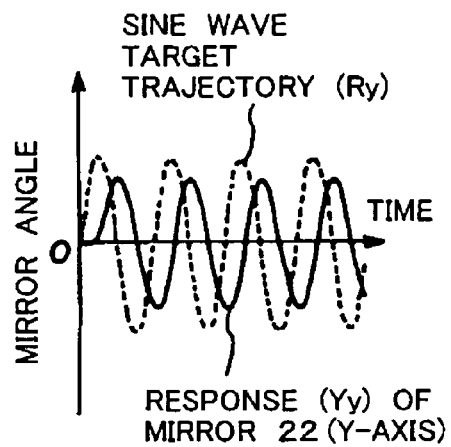
Figure 5:
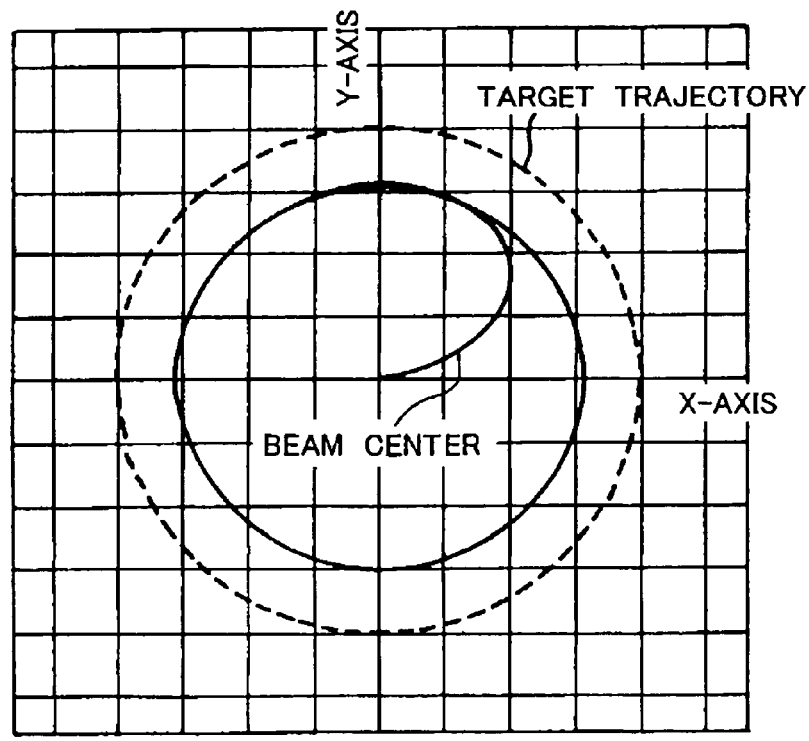
FIG. 5 is a graph showing a phase plane trajectory in a system manufactured by way of trial.
Figure 6:
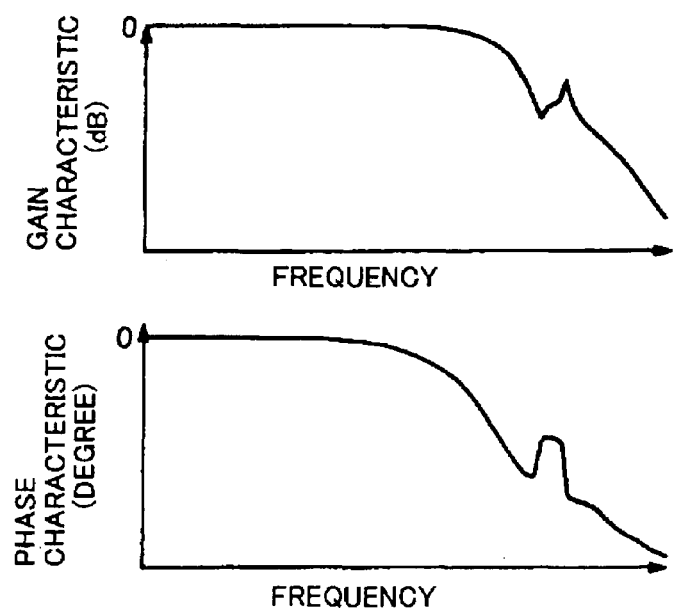
FIG. 6 is a Bode diagram showing the frequency response characteristics of an X-axis feedback control circuit according to the present invention.
Figure 7:
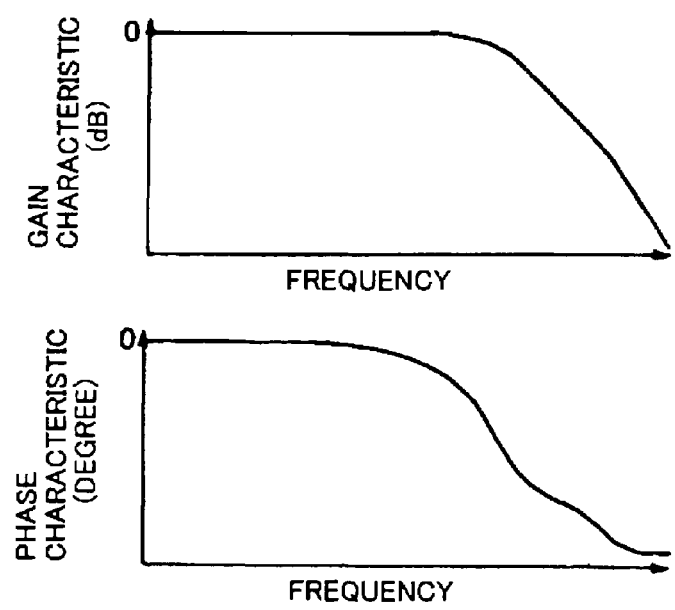
FIG. 7 is a Bode diagram showing the frequency response characteristics of a Y-axis feedback control circuit according to the present invention.

FIGS. 2A and 2B are graphs showing time response waveforms in which the target trajectory (cosine wave) of the mirror 12 and the target trajectory (sine wave) of the mirror 22 are corrected with the inverse dynamic characteristics of the gain characteristics and the phase characteristics estimated respectively under the same conditions of the frequencies and amplitudes of the target trajectories as those in FIG. 4, and the corrected target trajectories are inputted as desired values, respectively. In each of FIGS. 2A and 2B, the dotted line designates an original target trajectory, the dashed line designates a corrected target trajectory, and the solid line designates a response waveform.

In each mirror 12, 22, the transient state is attenuated when about a half of period has passed since the start of inputting a desired value. Thus, the laser beam overlaps the uncorrected target trajectory.

Figure 3:
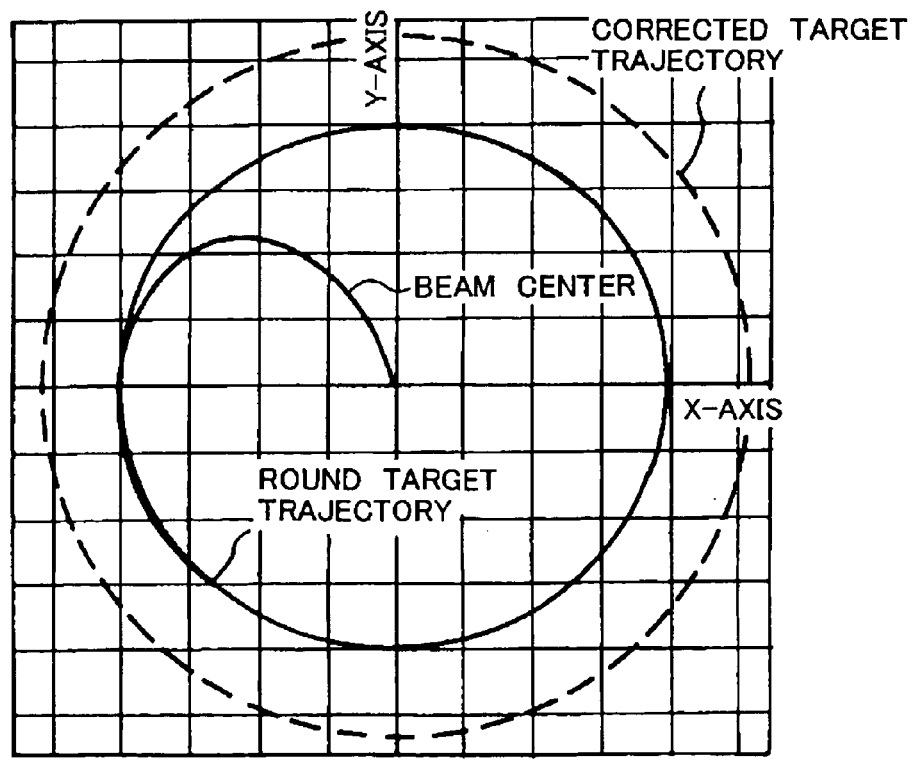
FIG. 3 is a graph showing a phase plane trajectory according to the present invention.

FIG. 3 shows a phase plane trajectory of FIGS. 2A and 2B. It is observed that the center of the laser beam exactly coincides with the uncorrected target trajectory by the effect of the corrected target trajectory.

Incidentally, it is necessary to stop emitting the laser beam pulses during the transient response in which there appears a change in radius. Therefore, the servo control circuit 3 transmits a binary signal to the control circuit 5 so as to notify the control circuit 5 whether the mirrors are in transient response or not.

Incidentally, Step 1 may be performed once prior to machining. For example, Step 1 is performed as soon as the laser machining apparatus is powered on, and estimated characteristic data which will be described later are stored in the internal memory or the like of the microprocessor 32.

In addition, Step 2 is performed whenever target trajectory tracking machining is performed.

When the principle of Fourier series is used, every periodical target trajectory can be obtained by a superposition of a plurality of sine waves. For example, assume that a hole shaped like a rectangle having sides parallel with coordinate axes is to be machined. In addition, assume that a beam trajectory is formed into a rectangular wave starting at one corner of the rectangle and reciprocating linearly at a fixed speed in the direction of one of the two pairs of sides of the rectangle while moving stepwise at the turn of the trajectory by a fixed distance in the direction of the other pair of sides. In this case, the target trajectory of the former mirror becomes a triangular wave, and the target trajectory of the latter mirror becomes a stepped form. The Fourier expansion of a triangular wave is a superposition of a sine wave of a fundamental frequency and its odd-multiple harmonics. Practically the triangular wave target trajectory can be formed out of a finite number of harmonics. Thus, when the gain/phase characteristics of feedback control are estimated in advance for each frequency component, and the sine wave is corrected with the inverse characteristics of the estimated gain/phase characteristics, the mirror of one axis can be made to track a desired triangular wave accurately. Since the mirror of the other axis requires a fixed very small stepping operation, a simple stepping desired value may be set. Then, in this machining, it will go well if the coordinates of a specific point in the hole and the lengths of two sides are provided as data of feature quantities of a shape to be machined.

Incidentally, it is necessary to stop emitting the laser beam pulses during the transient response in which the beam trajectory turns back. Therefore, the servo control circuit 3 transmits a binary signal to the control circuit 5 so as to notify the control circuit 5 whether the mirrors are in transient response or not.

In such a manner, when a periodical target trajectory is set for the operation of the mirror of each axis, a beam trajectory having a desired shape can be formed at a high speed and with a high accuracy.

Incidentally, although the gain characteristic and the phase characteristic of each feedback control circuit are estimated by arithmetic operation in the aforementioned description, a transfer function approximately corresponding to the inverse characteristics of the feedback control circuit based on the estimated results of the gain/phase characteristics in each frequency may be formed as a digital filter directly by the microprocessor 32. In such a manner, the operation of each mirror can be controlled accurately to track a target trajectory having a desired frequency component.

In addition, for example, when the torque constant of the actuator has a variation depending on the angle of the mirror, the dynamic characteristics of the feedback control circuit also has angle dependence. In such a case, the dynamic characteristics are estimated at a plurality of places with the angle of the mirror being changed, and the target trajectory is corrected in halfway points accurately by interpolation of estimated values or a regression curve. Thus, the influence of the angle dependence of the dynamic characteristics can be compensated.

In addition, although the output timing of the laser oscillator 7 is controlled by the control circuit 5 in the aforementioned embodiment, the laser oscillator may be controlled directly by the calculating unit 6 in FIG. 1. In this case, the control circuit 5 is dispensable when feature data are supplied from the calculating unit 6 to the servo control circuit 3.

Further, although the gain characteristic and the phase characteristic of the feedback control circuit are estimated in the aforementioned embodiment, the gain characteristic and the phase characteristic estimated for each frequency in advance may be stored in a storage unit. In addition, whenever the characteristics are estimated, the result of estimation may be accumulated in the storage unit.

As described above, according to the present invention, the target trajectories of two axes are corrected to compensate the gaps of the dynamic characteristics of the feedback control circuits of the mirrors 12 and 22. Accordingly, the mirrors can be controlled to track their periodical target trajectories with a high accuracy and at a high speed respectively. Then, when such an optical scanner is adopted in a laser machining apparatus, the manufacturing time can be shortened due to high-speed machining, or the yield can be improved due to high-accuracy machining.

What is claimed is:

1. An optical scanner comprising:
   a mirror fixed to a rotating shaft;
   feedback control means for controlling a detected angle of said mirror so that said angle coincides with a desired value; and
   corrected target trajectory generating means for correcting a target trajectory so as to cancel a gain characteristic and a phase characteristic of said feedback control means with respect to a specific frequency;
   wherein an output signal of said corrected target trajectory generating means is supplied to said feedback control means as said desired value.

2. An optical scanner comprising:
   a mirror fixed to a rotating shaft;
   feedback control means for controlling a detected angle of said mirror so that said angle coincides with a desired value;
   corrected target trajectory generating means for correcting a target trajectory so as to cancel a gain characteristic and a phase characteristic of said feedback control means with respect to a specific frequency, wherein an output signal of said corrected target trajectory generating means is supplied to said feedback control means as said desired value; and
   frequency characteristic estimating means for estimating a gain characteristic and a phase characteristic of said feedback control means;
   wherein said gain characteristic and said phase characteristic of said feedback control means with respect to said specific frequency are estimated by said frequency characteristic estimating means.

3. An optical scanner according to claim 2, wherein said desired value corresponds to a periodical target trajectory made from a superposition of sine waves of one or plural frequencies, while a gain characteristic and a phase characteristic of each frequency constituting said target trajectory are estimated by said frequency characteristic estimating means, and said periodical target trajectory is corrected to cancel said gain characteristic and said phase characteristic.

4. An optical scanner according to any one of claims 1 to 3, wherein said corrected target trajectory generating means is inverse characteristic filter means for performing a filter operation having inverse characteristics of said gain characteristic and said phase characteristic estimated by said frequency characteristic estimating means.

5. A laser machining apparatus comprising:
   the optical scanner according to claim 1;
   wherein a two-dimensional trajectory of a laser beam is drawn in a surface of a work to be machined, so that said work is machined two-dimensionally by said laser beam.

6. The laser machining apparatus according to claim 5, further comprising:
   control means for suspending irradiation of said work with said laser beam during a transient state where said target trajectory has a temporary sudden change.

7. A laser machining apparatus comprising:
   the optical scanner according to claim 2;
   wherein a two-dimensional trajectory of a laser beam is drawn in a surface of a work to be machined, so that said work is machined two-dimensionally by said laser beam.

8. The laser machining apparatus according to claim 7, further comprising:
   control means for suspending irradiation of said work with said laser beam during a transient state where said target trajectory has a temporary sudden change.

9. A laser machining apparatus comprising:
   the optical scanner according to claim 3;
   wherein a two-dimensional trajectory of a laser beam is drawn in a surface of a work to be machined, so that said work is machined two-dimensionally by said laser beam.

10. The laser machining apparatus according to claim 9, further comprising:
    control means for suspending irradiation of said work with said laser beam during a transient state where said target trajectory has a temporary sudden change.

11. A laser machining apparatus comprising:
    the optical scanner according to claim 4;
    wherein a two-dimensional trajectory of a laser beam is drawn in a surface of a work to be machined, so that said work is machined two-dimensionally by said laser beam.

12. The laser machining apparatus according to claim 11, further comprising:
    control means for suspending irradiation of said work with said laser beam during a transient state where said target trajectory has a temporary sudden change.

* * * * *